Oct. 10, 1939.  J. H. PAYNE  2,175,306
CONTAINER FOR HYDROGEN-FILLED ELECTRICAL DEVICES
Filed Sept. 11, 1937
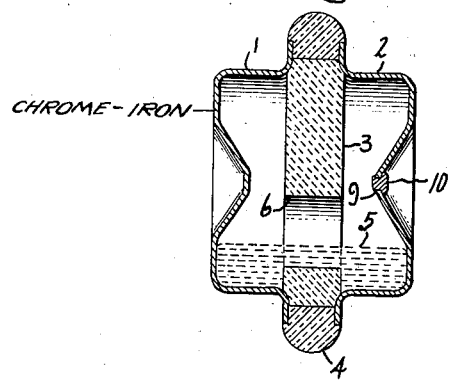
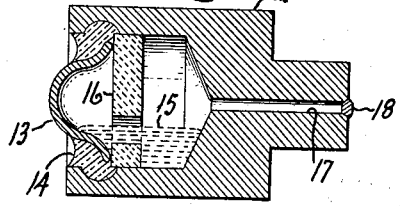
Inventor:
John H. Payne,
by Harry E. Dunham
His Attorney.

Patented Oct. 10, 1939

2,175,306

UNITED STATES PATENT OFFICE 2,175,306

CONTAINER FOR HYDROGEN-FILLED ELECTRICAL DEVICES

John H. Payne, Ballston Spa, N. Y., assignor to General Electric Company, a corporation of New York Application September 11, 1937, Serial No. 163,489

2 Claims. (Cl. 200—152)

The present application is a continuation in part of my copending application Ser. No. 759,527, filed Dec. 28, 1934, now Patent No. 2,101,092 issued December 7, 1937.

The invention which is described and claimed herein relates to containers for enclosed electrical devices which employ hydrogen as an operating medium. While not limited thereto, the invention is particularly applicable in connection with hydrogen-filled liquid flow switches such, for example, as the switches disclosed in my aforesaid Patent No. 2,101,092.

In such devices, especially in those in which mercury is used as an operating element, it is desirable for practical reasons to employ a ferrous metal, such as sheet steel, as the container material. It has been observed, however, that ordinary iron or steel is so highly pervious to hydrogen as to make hydrogen leakage a serious limitation on the useful life of hydrogen-filled devices in which it is used as a container material.

It is a primary object of the present invention to provide ferrous metal containers which are substantially impervious to hydrogen.

It is a further object to provide in connection with a hydrogen-filled mercury flow switch a commercially practical metal container which is both resistant to mercury and impervious to hydrogen.

I have found that the foregoing objects may be attained by the use as a container material of iron alloyed with chromium. I am aware that chrome-iron metals have heretofore been utilized as contact electrodes and as component elements of glass-to-metal seals, but, as far as I am at present informed, such metals have not heretofore been employed as a principal wall material for hydrogen-filled containers.

The features of novelty which I desire to protect herein will be pointed out particularly in the appended claims. The invention itself together with the appended claims may best be understood by reference to the following description taken in connection with the drawing, in which Fig. 1 is a view in partial section of a metal enclosed liquid flow switch suitably embodying my invention, and Fig. 2 is a similar representation of an alternative form of switch in which the invention may advantageously be employed.

Referring particularly to Fig. 1, I have shown a switch of the general type described and claimed in the Patent No. 2,101,092 previously referred to. As illustrated, this switch comprises a pair of hollow metal members 1 and 2 so juxtaposed as to form an enclosed space between them. These members are spaced and insulated from one another by means of an apertured barrier 3 which may consist, for example, of an insulating material such as magnesia or alumina. The members are hermetically joined by means of a thin ring 4 of glass or other thermo-plastic material sealed directly thereto in such a way as to be also in continuous contact with the outer periphery of the barrier 3. Within the switch there is provided a quantity of mercury or equivalent conductive material 5 adapted to establish a continuous circuit between the members 1 and 2 through an aperture 6 provided in the barrier 3. Circuit-interrupting operation is obtained by rotating the switch to bring the aperture 6 above the surface of the mercury, thereby interrupting the electrical continuity of the latter. A typical switch, having a rating of five amperes is about one-half inch in diameter and about one-half inch in axial extent.

For reasons to be stated in the following, one may advantageously employ in connection with a switch such as that illustrated, a charge of hydrogen ranging in pressure from about one atmosphere to much higher pressures. Such hydrogen may be introduced into the switch during the manufacturing process through an opening 9 provided in the metal member 2. This opening is thereafter sealed, preferably by fusion welding a closure member 10 therein, for example, in accordance with the procedure described and claimed in John H. Payne Patent No. 2,141,932 issued December 27, 1938.

Mercury switches are filled with hydrogen in order to obtain desired characteristics of circuit interruption, it being known that this hydrogen facilitates the extinguishment of any arcs therein. The maintenance of these desired characteristics is obviously dependent upon the continued retention of this hydrogen atmosphere within the switch envelope. Where pressures of the order of two atmospheres of hydrogen are employed it has ben determined by exhaustive experiment that the loss of even one-half of this hydrogen will render the switch unsatisfactory for further use in many commercial applications.

In glass switches this offers no problem, since glass is substantially impervious to hydrogen. In connection with metal enclosed switches, however, the problem of retaining the hydrogen becomes very important in that iron, the most appropriate material from an economic and manufacturing standpoint, is found to be highly porous as far as hydrogen is concerned. The significance of this porosity may best be understood from the following considerations:

At room temperature the rate of free hydrogen leakage through an iron membrane, expressed in cubic millimeters per minute, may be represented as $$\frac{AP}{T} \times 10^{-5}$$

where A is the area of the membrane in square centimeters, T is its thickness in centimeters, and P is the difference in the hydrogen partial pressures on opposite sides of the membrane, expressed in atmospheres. Applying this observation to a typical switch such as the five ampere switch previously referred to wherein A is 7.5 cm.$^2$, T is .08 cm. and P is about 1, the rate of hydrogen loss for a pure iron construction is about $95 \times 10^{-5}$ millimeters per minute. The total volume of gas contained in the switch is about 800 mm.$^3$. Consequently half the gas would be lost (and the switch rendered unsuitable for use in many applications) in about $4.2 \times 10^5$ minutes, which is equal to about 10 months. This is an impractically short life and could not be tolerated in a commercial switch.

In accordance with my present invention this difficulty is overcome in a simple and practical manner by utilizing as a container metal a ferrous metal comprising an appreciable quantity of chromium. The addition of as little as 1 per cent of chromium to iron will decrease its porosity to hydrogen many times and a substantially greater quantity of chromium will render the iron practically impermeable. I consider it advantageous to use in connection with mercury switches an alloy of iron with about 26 to 30 per cent of chromium, since such an alloy is well adapted to seal to certain commercially available glasses. The rate of loss of hydrogen from a switch thus constructed is so small that at least 250 years will elapse before an initial pressure of two atmospheres will be decreased to one-half that value, this representing an enormous increase in useful life of the switch over the 10 month life obtainable with a pure iron switch of similar construction, as described hereinbefore.

It should be understood, of course, that the invention is in no way limited to the particular type of device illustrated in Fig. 1, and in Fig. 2 I have shown an alternative form of switch in connection with which it may be even more advantageously employed. In this embodiment the switch is constructed to contain a charge of hydrogen having a very great pressure, preferably on the order of from 10 to 100 atmospheres, whereby the switch has a high interrupting capacity. As illustrated, the switch comprises a relatively heavy cup-shaped member 12 of a ferrous material joined to a smaller metal cap 13 by means of a ring of sealing material 14, for example, of glass. The switch contains a quantity of mercury 15, and is provided with an arc-interrupting barrier 16 corresponding to the similar element described in connection with Fig. 1. A narrow opening 17 formed in the member 12 is used to introduce mercury and a gaseous filling into the switch during the course of manufacture. In the completed switch this opening is preferably sealed by means of a closure member 18.

It will be understood that because of the great hydrogen pressure employed there would be a rapid loss of hydrogen through the metal wall portions if these wall portions were constituted of iron or ordinary steel, the rate of escape being so great as seriously to impair the utility of the switch within a short time. However, by utilizing an iron chromium alloy as previously explained, the hydrogen content is maintained without appreciable loss for many years.

While I have described my invention primarily in connection with liquid flow switches, it will be understood that it is also capable of application in connection with other types of devices, such as electrical discharge devices, ballast resistances, and contactors in which hydrogen is employed as an operating medium. Furthermore, it may advantageously be employed in enclosed devices which are not initially charged with hydrogen, but which contain an unstable hydrogenous material such as pentane or ammonia adapted to generate hydrogen which thereafter contributes to the satisfactory operation of the device. I, therefore, aim in the appended claims to cover all uses of the invention which fall within the true spirit and scope of the foregoing disclosure.

What I claim as new and desire to secure by Letters Patent of the United States, is:

1. A fluid flow switch comprising a pair of cup-shaped members, of chrome-iron alloy insulated from each other by a narrow glass ring which is fused to each of said members to form a hermetically sealed chamber, mercury in said chamber in sufficient quantity to close an electrical circuit between said cup-shaped members in one position of said switch but insufficient to close it in another position of said switch, and a filling of hydrogen within said chamber at a pressure of at least two atmospheres, said pressure being critical to the operation of said switch, the chromium content of said chrome-iron alloy being sufficient in amount to render said alloy substantially impervious to said hydrogen, whereby the hydrogen within said chamber is maintained indefinitely at said critical pressure.

2. A liquid contact switch comprising a generally cup-shaped metal member forming the main body of the switch, another metal member closing the open end of the switch and insulated therefrom by a vitreous body fused to both of said members, said vitreous body being mechanically interlocked with said cup-shaped members, a quantity of mercury within the switch for establishing contact between said members, means operable in at least one position of the switch to interrupt the electrical continuity of the mercury, and a charge of hydrogen at a pressure of at least 10 atmospheres within the switch, said metal members comprising an iron-chromium alloy the chromium content of which is sufficient to render said members substantially impervious to hydrogen, whereby the hydrogen content of said switch is maintained indefinitely at substantially the critical initial pressure.

JOHN H. PAYNE.